United States Patent [19]

Aoyagi et al.

[11] Patent Number: 5,652,925
[45] Date of Patent: Jul. 29, 1997

[54] IMAGE SENSOR SYSTEM AND AUTO-FOCUS DETECTION DEVICE

[75] Inventors: Hidehiko Aoyagi, Kawasaki; Seiichi Yasukawa, Yotsukaido; Yosuke Kusaka, Yokohama, all of Japan

[73] Assignee: Nikon Corporation, Tokyo, Japan

[21] Appl. No.: 523,145

[22] Filed: Sep. 5, 1995

[30] Foreign Application Priority Data

Sep. 7, 1994 [JP] Japan .................................. 6-213449

[51] Int. Cl.⁶ .................................................. G03B 13/32
[52] U.S. Cl. ................................................... 396/96
[58] Field of Search .............................. 354/406, 403, 354/400, 402; 396/96

[56] References Cited

U.S. PATENT DOCUMENTS

| | | | |
|---|---|---|---|
| 4,411,505 | 10/1983 | Sakai et al. | 354/402 |
| 4,618,235 | 10/1986 | Ishida et al. | 354/406 |
| 4,633,075 | 12/1986 | Saki et al. | 250/201 |
| 4,719,486 | 1/1988 | Hoshino et al. . | |
| 4,876,603 | 10/1989 | Suzuki et al. | 358/227 |
| 4,922,279 | 5/1990 | Hamada et al. | 354/400 |
| 4,931,822 | 6/1990 | Yamano . | |
| 5,005,087 | 4/1991 | Suzuki et al. | 354/402 |
| 5,089,842 | 2/1992 | Uchiyama et al. . | |
| 5,502,538 | 3/1996 | Ogasawara | 354/402 |

*Primary Examiner*—Russell E. Adams
*Attorney, Agent, or Firm*—Oliff & Berridge

[57] ABSTRACT

The invention has the object of obtaining an image output of the appropriate size, even in cases in which the saturation level changes when the amplifier gain is switched, so that high precision focus detection can be carried out continually. The image sensor system includes an image sensor that outputs an image signal according to the light intensity distribution of the subject image that has been composed by the optical system; an amplifier that amplifies the image signal from the image sensor; an amplification ratio switching capability that changes the amplification ratio of the amplification means to a prescribed amplification ratio; an accumulation time interval calculator that calculates the accumulation time interval of the image sensor based on the target value of the image sensor output that has been selected according to the amplification ratio and the amplified image output; and an image sensor controller that controls the operation of the image sensor based on the accumulation time interval that is calculated by the accumulation time interval calculator.

15 Claims, 5 Drawing Sheets

IMAGE SENSOR SYSTEM AND AUTO-FOCUS DETECTION DEVICE

BACKGROUND OF THE INVENTION

1. Field of the Invention

The invention relates to an auto-focus detection device and an auto-focus detection method in an auto-focus detection camera.

2. Description of Related Art

Auto-focus detection cameras have a focus detection area in the center or similar selected areas of the photographic field. The photo lens is automatically driven so that a subject caught in this focus detection area is focused. Thus, the photographer can place the principal subjecting focus by causing the desired subject (referred to hereafter as "the principal subject") to be positioned in the focus detection area within the photographic field.

A conventionally known focus detection method used by the auto-focus detection device of cameras is the phase difference detection method. In this method, two images in parallax with the subject are conducted onto a pair of image sensors, the relative shifting amount of the two images is calculated from the image output of the pair of image sensors, and the focus condition is determined. This method is described using FIG. 4.

Figure 4:
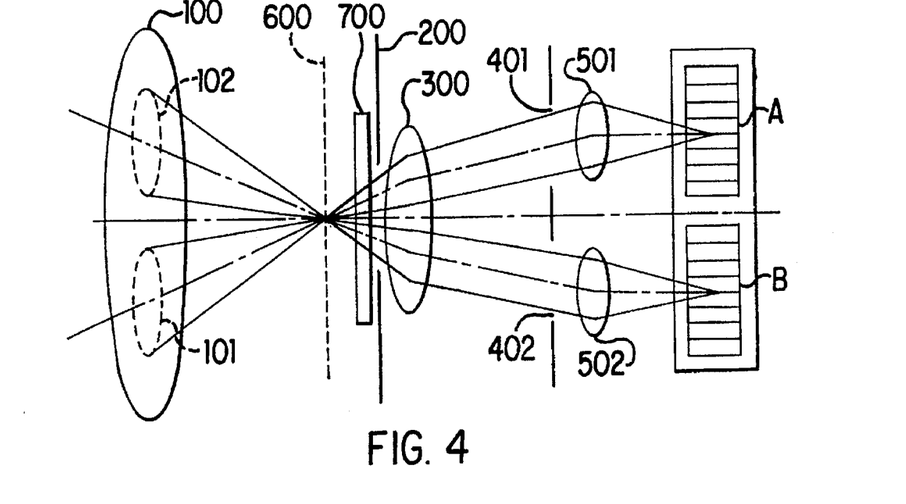
FIG. 4 is a schematic representation that shows the focus detection optical system.

After the light rays, incident through region 101 of the object lens 100, converge at the focal point for the film surface 600 or the focal surface, light rays are composed into an image on image sensor A through a band pass filter 700, a field of vision mask 200, a filter lens 300, a diaphragm aperture 401, and a recomposing lens 501. In the same manner, after the light rays incident through region 102 of the object lens 100 converge at the focal point for the film surface 600 or the focal surface, the light rays are composed into an image on image sensor B through the band pass filter 700, the field of vision mask 200, the filter lens 300, a diaphragm aperture 402, and a recomposing lens 502.

The pair of subject images, that have been composed on the image sensors A and B, will diverge in the so-called front focus condition, in which the object lens 100 forms a clear image of the subject in front of a pre-set focal surface, and will converge in the so-called back focus condition, in which a clear image of the subject is formed behind the pre-set focal surface. In the so-called focused condition, in which a clear image is formed exactly at the pre-set focal surface, the subject images on the image sensors A and B correspond to each other.

The pair of subject images undergoes photoelectric conversion by the image sensors A and B and is converted to electrical signals. By mathematically processing the signals and calculating the relative positions of the two subject images, the focus adjustment condition, which here refers to the amount and direction of separation from the focused condition (referred to hereafter as "the defocus amount"), of the object lens 100 is determined.

The focus detection area becomes the area in which the image sensors A and B are projected through the recomposing lenses 501 and 502 and reflects the overlap in the vicinity of the pre-set focal surface.

Figure 5A:
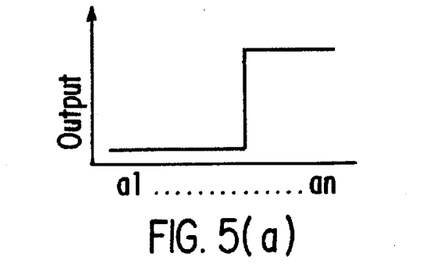
FIGS. 5(a)–5(c) are drawings for explaining the focus detection calculation.
Figure 5B:
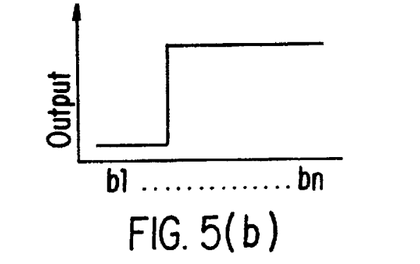

The mathematical processing method by which the defocus amount is calculated will now be described. The image sensors A and B each comprise a plurality of photoelectric converting elements and, as shown in FIGS. 5 (a) and (b), output a plurality of photoelectrically converted outputs a1 ... an and b1 ... bn, respectively. Correlation calculations are carried out while each data line is shifted by a specified data amount L. Specifically, the correlation amount C (L) is calculated through the following expression 1.

$$C(L) = \sum_{i=k}^{r} |ai - bj| \tag{1}$$

L is an integer that corresponds to the data line shift amount as described above. The initial value k and the ultimate value r may be changed, depending on the shift amount L.

Figure 5C:
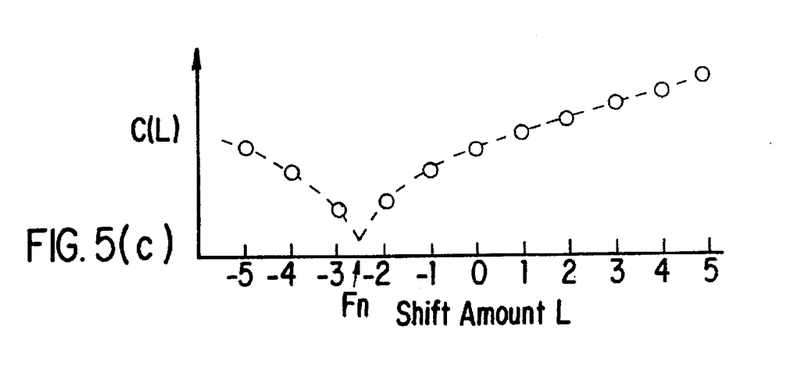
Figure 6:
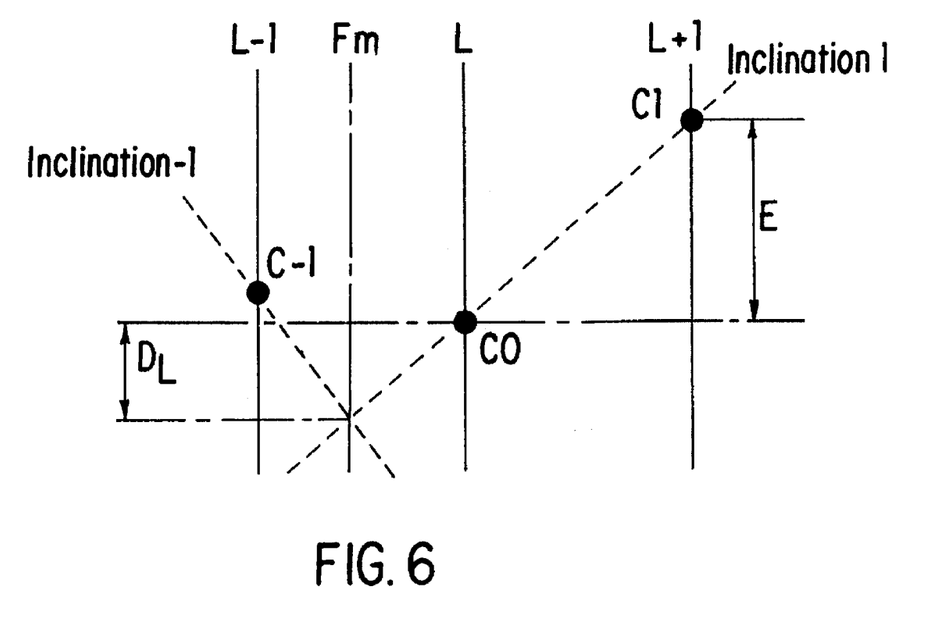
FIG. 6 is a drawing for explaining the focus detection calculation.

Among the correlation amounts C (L) that are obtained, the amount which consists of the shift amount that gives the correlation amount with the absolute minimum value and which is associated with a constant that is determined by the optical system shown in FIG. 4 and the pitch width of the photoelectric converting elements of the image sensors becomes the defocus amount. However, as shown in FIG. 5 (c), the correlation amounts C (L) are scattered values, and the smallest unit of the defocus amount that can be detected is limited by the pitch width of the photoelectric converting elements of the image sensors. Therefore a method is proposed in which a new absolute minimum value Cex is calculated by carrying out an interpolation calculation from the scattered correlation amounts C (L) and then carrying out detailed focus detection (See Japanese Unexamined Patent Application Sho 60-37513). This is a method which calculates Cex from the correlation amount C (0), which is the absolute minimum value, as shown in FIG. 6, and the correlation amounts C (1) and C (−1), which are the shift amounts on either side of the correlation amount C (0). The shift amount Fm that gives the absolute minimum value Cex and the defocus amount DF are calculated according to the following equations.

$$DF=Kf*Fm$$

$$Fm=L+DL/E$$

$$DL=\{C(-1)-C(1)\}/2$$

$$Cex=C(0)-|DL|$$

$$E=MAX[\{C(-1)-C(0)\},\{C(1)-C(0)\}] \tag{2}$$

MAX {Ca, Cb} means that the largest value among Ca and Cb is selected. Kf is a constant that is determined by the optical system shown in FIG. 4 and by the pitch width of the photoelectric converting elements of the image sensors.

It is necessary to determine whether the defocus amount thus obtained indicates the true defocus amount, or whether the defocus amount has undergone vibration of the correlation amount due to noise or the like. A defocus amount that satisfies the following expressions is considered to be reliable.

$$E>E1 \text{ and } Cex/E<G1 \tag{3}$$

where E1 and G1 are specified values. E is a value that depends on the contrast of the subject; the larger the value, the higher the contrast and the higher the reliability. Cex/E depends mainly on the degree of coincidence of the images; the closer to 0, the higher the reliability.

When it is determined that the defocus amount is reliable, the object lens 100 is driven to bring the subject into focus, based on the defocus amount DF.

CCD's or the like, consisting of charge accumulating-style photoelectric converting elements, are generally used for each of the element sensors that form the image sensors. If the size of the image output of these image sensors is not adequate, high precision cannot be obtained and detection becomes impossible.

For example, if a picture such as that shown in FIG. 3 (a) is viewed, it is desirable for an image output, such as that shown in FIG. 3 (c), be obtained. In this figure, Vsat indicates the saturation level of the photoelectric converting elements. However, if the accumulation time interval is short, a low contrast output results, as shown in FIG. 3 (b). Conversely, if the accumulation time interval is long, the original contrast disappears, as shown in FIG. 3 (d). Therefore it is necessary to obtain an image output of the appropriate size and the charge accumulation must be carried out over an appropriate accumulation time interval. Examples are given hereafter of methods for calculating this appropriate accumulation time interval.

Figure 3A:
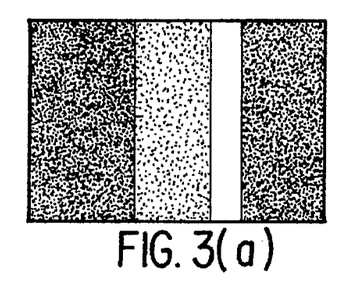
FIGS. 3(a)–3(d) are drawings for explaining the autogain control (AGC)
Figure 3B:
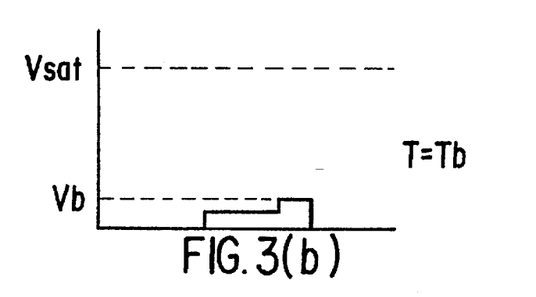
Figure 3C:
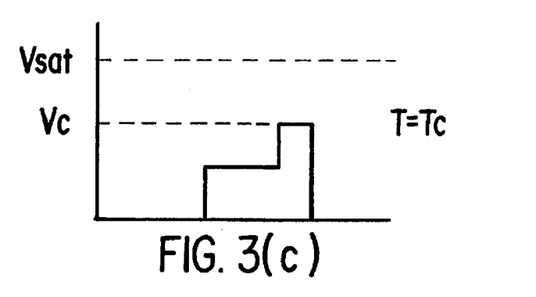
Figure 3D:
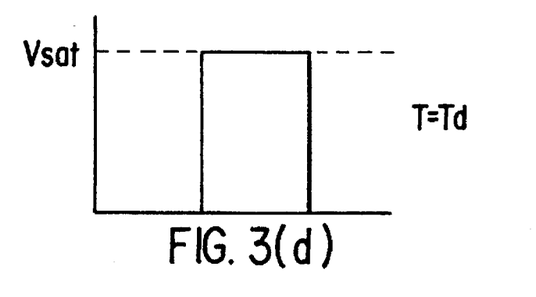

One example of an accumulation time interval calculating method is a method in which the peak value or the like of the output at the next accumulation becomes the appropriate value, based on the accumulation time interval of the previous accumulation and on the image output of the image sensor. For example, if an output such as that in FIG. 3 (b) is obtained, the accumulation time interval at that time is Tb and the peak output is Vb. In this case, in order to obtain the appropriate output such as that shown in FIG. 3 (c) for the next accumulation operation, the accumulation time interval should be set to Tc=(Vc/Vb)×Tb. In this formula, Vc is the target value; Vc=A×Vsat, where A is a positive real number less than 1. The size of A is established by the "appropriate size" of the image output. If A is too small, the contrast will be continually low; conversely, if A is too large, the image output will immediately saturate with merely a slight increase of the subject brightness. However, the size of the image output described above does not include noise components from dark currents or the like. This method is hereafter designated as soft AGC (Auto Gain Control).

Another example is a method in which an AGC sensor is provided near the image sensor, and an appropriate accumulation time interval is calculated based on the output of the AGC sensor. This method is hereafter designated as hard AGC.

In cases in which the subject is dark and an image output of the appropriate size is sought, the accumulation time interval becomes too long. Therefore the accumulation time interval is shortened, and the obtained image output is amplified through an amplifier (amp). If this is done, an appropriate image output can be obtained for both bright subjects and dark subjects by switching the amplifier gain according to the subject brightness.

However, the saturation level of accumulation-type photoelectric converting elements changes when the amplifier gain is switched. For example, the amplifier gain is taken to have an amplification ratio of one in the lowest case and two in the highest case. In addition, the accumulation capacity is taken to be 3.8 V, and the dynamic range of the circuit on the amp side is taken to be 4 V.

When the amplifier gain is lowest, the charge accumulates to the full accumulation capacity, and becomes saturated through the overflow of the capacity. In the case of the above example, since accumulation to 3.8 V takes place through the sensors and is multiplied by one through the amp, the saturation level is 3.8 V.

When the amplifier gain is high, the saturation level is set by the amp side circuit, and charge does not accumulate to the full capacity. Thus, since accumulation to 2 V takes place through the sensors and is multiplied by two to become the 4 V of the full dynamic range, the saturation level becomes 4 V.

Thus, when the accumulation time interval and the dynamic range of the amp side circuit are different, a problem arises in that the appropriate output and the appropriate accumulation time interval in the case of one amplifier gain are not necessarily appropriate in the case of a different amplifier gain.

Raising the accumulation capacity and the dynamic range results in an increase in the image resolution, but there is a simultaneous increase in dark current, and the layout of the sensor base plate also becomes a difficult problem.

SUMMARY OF THE INVENTION

The invention has the object of obtaining an image output of the appropriate size, even in cases in which the saturation level changes when the amplifier gain is switched, so that high precision focus detection can be carried out continually.

In order to accomplish the above-mentioned objective, the image sensor system has a structure which comprises an image sensor that outputs an image signal according to the light intensity distribution of the subject image that has been composed by the optical system; an amplification means that amplifies the image signal from the image sensor; an amplification ratio switching means that changes the amplification ratio of the amplification means to a prescribed amplification ratio; an accumulation time interval calculating means that calculates the accumulation time interval of the image sensor based on the target value of the image sensor output that has been selected according to the amplification ratio, the amplified image output, and the amplification ratio; and an image sensor controlling means that controls the operation of the image sensor based on the accumulation time interval that is calculated by the accumulation time interval calculating means.

In addition, the invention when used on an autofocus detection device has a structure which comprises an image sensor that outputs an image signal according to the light intensity distribution of the subject image that has been composed by the optical system; an amplification means that amplifies the image signal from the image sensor; an amplification ratio switching means that changes the amplification ratio of the amplification means to a prescribed amplification ratio; an accumulation time interval calculating means that calculates the accumulation time interval of the image sensor based on the target value of the image sensor output that has been selected according to the amplification ratio, the amplified image output, and the amplification ratio; an image sensor controlling means that controls the operation of the image sensor based on the accumulation time interval that is calculated by the accumulation time interval calculating means; and a focus adjustment information calculating means that calculates information relating to the focus adjustment of the photo lens, based on the image output.

With the invention, because the target value of the image sensor output is changed according to the amplification ratio and the accumulation is thus controlled, an appropriate image output can be obtained continually even if the saturation level of the image sensor changes.

BRIEF DESCRIPTION OF THE DRAWINGS

The invention will be described with reference to the drawings in which.

DETAILED DESCRIPTION OF THE PREFERRED EMBODIMENTS

Figure 1:
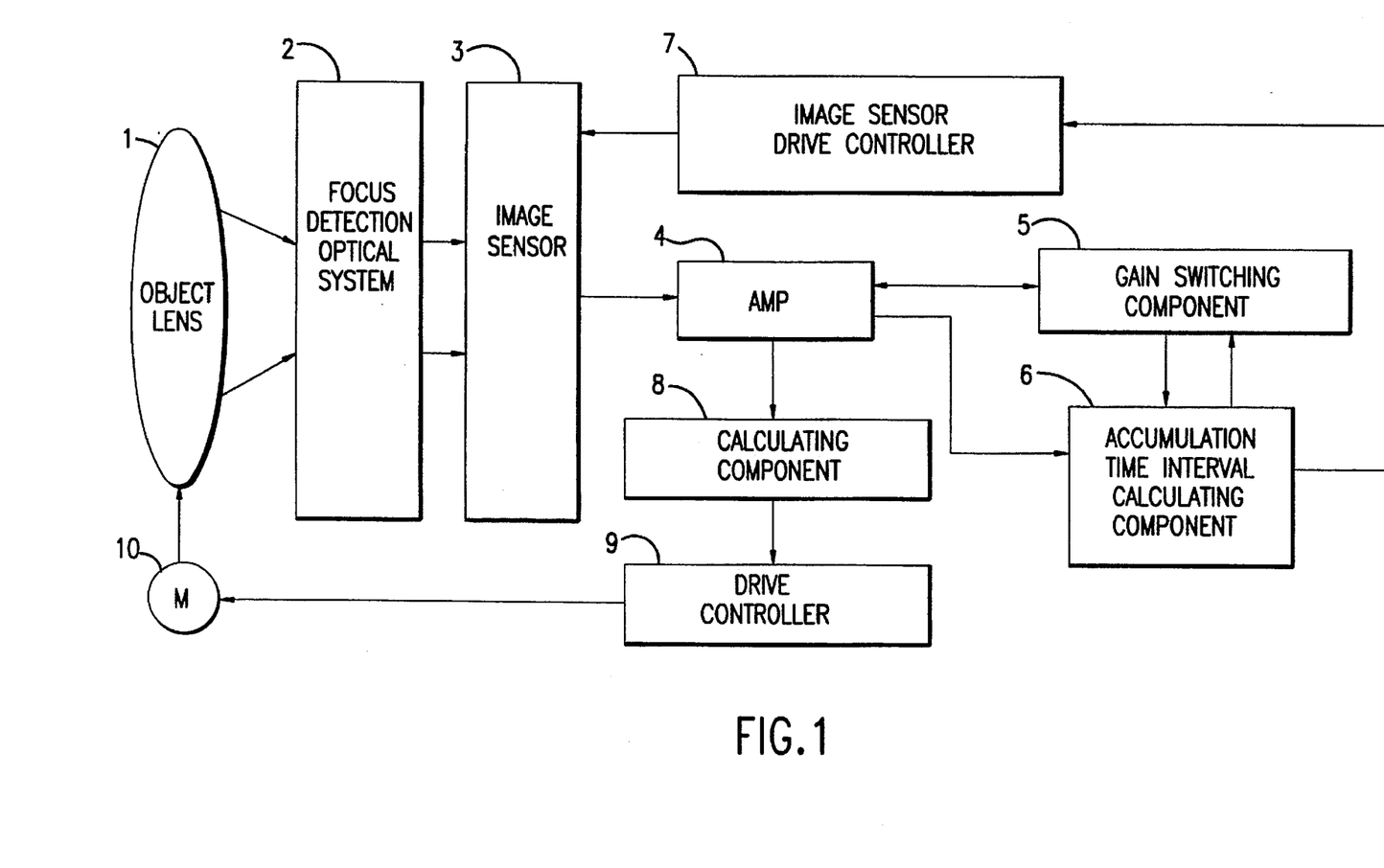
FIG. 1 is a block diagram that shows the structure of the embodiment of the invention.

FIG. 1 is a block diagram that shows the structure of an embodiment of the invention. The focus detection optical system 2 has a field of vision mask 200, a filter lens 300, diaphragm apertures 401 and 402, and recomposing lenses 501 and 502, such as shown in FIG. 4. A pair of light ray groups that pass through different regions on the object lens 1 are conducted to the image sensors 3, and subject images are composed on the respective image sensors 3.

The amp 4 amplifies the image output from the image sensors 3 based on the amplifier gain information from the gain switching component 5 and provides the amplified output image to the accumulation time interval calculating component 6 and to the calculating component 8.

The accumulation time interval calculating component 6 calculates the appropriate accumulation time interval, based on the amplified image output and on the amplifier gain information from the gain switching component 5, outputs this value to the image sensor drive controller 7, and outputs an amplifier gain switching signal to the gain switching component 5 as necessary. In addition, the accumulation time interval calculating component 6 carries out drive controlling of the focus detection device of the embodiment. The gain switching component 5 changes the gain of the amp 4 based on the amplifier gain switching signal.

The image sensor drive controller 7 drives the image sensors 3 based on the accumulation time interval calculated by the accumulation time interval calculating component 6. The calculating component 8 carries out an operation based on the amplified image output from the amp 4 and calculates the defocus amount of the object lens 1. The drive controller 9 controls the driving of the motor 10 based on the defocus amount calculated by the calculating component 8 and drives the object lens 1 to focus the subject.

Figure 2:
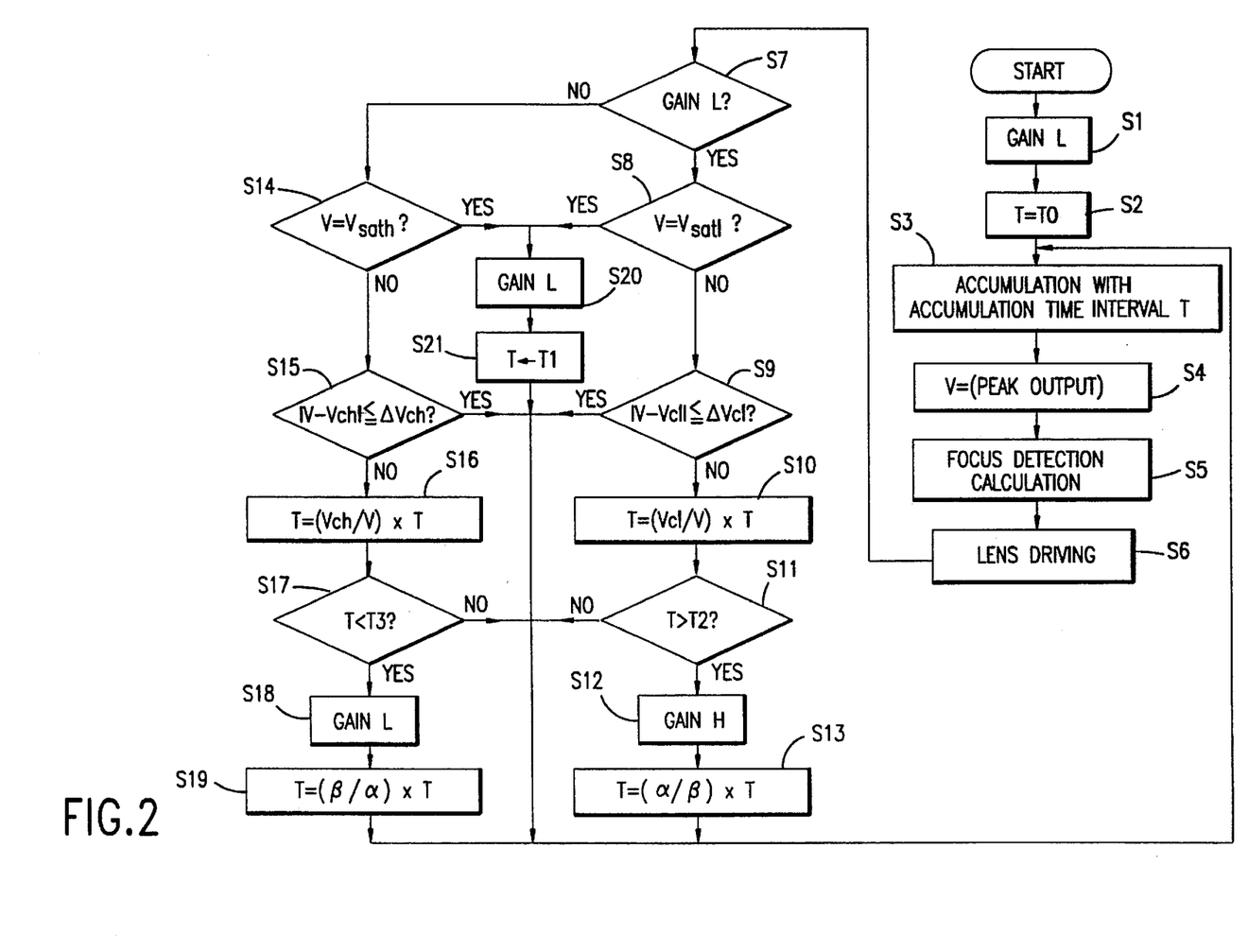
FIG. 2 is a flow chart of the processing of the embodiment of the invention.

FIG. 2 is a flow chart that shows the control of the focus detection operation through the accumulation time interval calculating component 6. The focus detection operation of the embodiment is described using the flow chart.

When the photographer half-presses the release button on the camera (not shown), the focus detection operation shown in FIG. 2 is commenced. First, in step 1, the gain is set to L by the gain switching component 5. The amplifier gain has two states, L (low) and H (high). The amplification ratio of L is $\alpha \times$(times) and the amplification ratio of H is $\beta \times$(times). Next, in step 2, an initial value T0 is substituted for the accumulation time interval T. In step 3, the charge accumulation of the image sensors 3 is carried out through the image sensor drive controller 7 based on the accumulation time interval T.

In step 4, the peak value of the image output is substituted for V. In step 5, a correlation calculation is carried out by the calculating component 8 based on the image output and, in step 6, the drive controller 9 drives the object lens 1 based on the defocus amount, which is the calculation result.

In step 7, it is determined whether the gain is L or H. If the gain is L, the program proceeds to step 8; if the gain is H, the program advances to step 14.

In step 8, it is determined whether V=Vsatl. Vsatl indicates the saturation level of the photoelectric converting elements when the gain is L. In other words, it is determined whether the image output at this point is saturated. If the image output is not saturated, the program proceeds to step 9; if the image output is saturated, the program proceeds to step 20.

In step 9, it is determined whether $|V-Vcl| \leq \Delta Vcl$. Vcl is the AGC target value when the gain is L, and $\Delta$ Vcl is a specified value that indicates the allowable range. If $|V-Vcl| \leq \Delta Vcl$ or, in other words, if the difference between the peak value of the image output and the AGC target value is within the allowable range, the program returns to step 3 and carries out the next accumulation with the same accumulation time interval T as before. If $|V-Vcl| > \Delta Vcl$, that is the difference is outside the allowable range, the program proceeds to step 10.

In step 10, the next accumulation time interval is calculated from the previous accumulation time interval T using the formula $T=(Vcl/V) \times T$. In step 11, it is determined whether the calculated accumulation time interval T is larger than a specified value T2. If T is smaller than T2, the program returns to step 3 and the next accumulation is carried out with the calculated accumulation time interval T. If T is larger than T2, the program proceeds to step 12.

In step 12, since the next accumulation will take too much time when the gain is L, the gain is switched to H by the gain switching component 5. In step 13, the accumulation time interval T is re-calculated from the accumulation time interval T calculated in step 10, using the formula $T=(\alpha/\beta) \times T$, and the program returns to step 3.

In step 7, if the gain is H, the program advances to step 14 and determines whether V=Vsath. Vsath indicates the saturation level of the photoelectric converting elements when the gain is H. If the image output is not saturated, the program proceeds to step 15.

In step 15, it is determined whether $|V-Vch| \leq \Delta Vch$. Vch is the AGC target value when the gain is H; $\Delta$ Vch is a specified value that indicates the allowable range. If $|V-Vcl| \leq \Delta Vch$, the program returns to step 3 and carries out the next accumulation with the same accumulation time interval T as before. If $|V-Vch| > \Delta Vch$, the program proceeds to step 16. In step 16, the next accumulation time interval is calculated from the previous accumulation time interval T using the formula $T=(Vch/V) \times T$.

Next, in step 17, it is determined whether the accumulation time interval T calculated in step 16 is smaller than a specified value T3. If T is larger than T3, the program returns to step 3 and the next accumulation is carried out using the calculated accumulation time interval T. If T is smaller than T3, the program proceeds to step 18.

In step 18, since the subject is sufficiently bright and no time is required for accumulation even when the gain is L, the gain is switched to L by the gain switching component 5 in order to improve the S/N ratio.

In step 19, the accumulation time interval is recalculated from the accumulation time interval T calculated in step 16, using the formula $T=(\beta/\alpha) \times T$, and the program returns to step 3.

If it is determined in step 8 or in step 14 that the image output is saturated, the program advances to step 20 and switches the gain to L through the gain switching component 5. In step 21, a specified value T1 is substituted for T, sufficiently suppressing the next output and the program returns to step 3.

In step 4, the value substituted for V need not necessarily be the peak value of the image output. For example, the output value to be substituted for V may be equal to the output value or it may be the maximum value of the output values, such that the number of element sensors of the image sensor 3, with a difference from the output value of no more than a specified value, is no less than a specified number. In addition, if it is determined in step 8 or step 14 that the image output is saturated, the gain may be left unchanged, and a specified value T1 may be substituted for T if the gain is L, and a specified value T4 may be substituted for T if the gain is H.

Also, if, in the above case, the gain is H and the previous accumulation time interval T is less than a specified value, the gain may be switched to L and a specified value T5 may be substituted for T. Also, instead of substituting the above-mentioned specified values T1 and T4, the previous accumulation time interval T multiplied by the reciprocal of a specified value $\gamma$ may be used as the next accumulation time interval.

Thus, with the invention, because the target value of the image sensor output is changed according to the amplification ratio and control of the accumulation is carried out, a proper image output can be obtained continually even if the saturation level of the image sensors changes. In addition, when used in a focus detection device, a continually good focus evaluation is possible.

What is claimed is:

1. An image sensor system, comprising:

an image sensor that outputs an image signal according to a light intensity distribution of a subject image that has been composed by an optical system;

an amplification means that amplifies the image signal from the image sensor;

an amplification ratio switching means that changes an amplification ratio of the amplification means to a prescribed amplification ratio;

an accumulation time interval calculating means that calculates an accumulation time interval of the image sensor based on a target value of the image sensor output that has been selected according to the amplification ratio and the amplified image output; and an image sensor controlling means that controls the operation of the image sensor based on the accumulation time interval that is calculated by the accumulation time interval calculating means.

2. An auto-focus detection device, comprising:

an image sensor that outputs an image signal according to a light intensity distribution of a subject image that has been composed by an optical system;

an amplification means that amplifies the image signal from the image sensor;

an amplification ratio switching means that changes an amplification ratio of the amplification means to a prescribed amplification ratio;

an accumulation time interval calculating means that calculates an accumulation time interval of the image sensor based on a target value of the image sensor output that has been selected according to the amplification ratio and the amplified image output;

an image sensor controlling means that controls the operation of the image sensor based on the accumulation time interval that is calculated by the accumulation time interval calculating means; and a focus adjustment information calculating means that calculates information relating to a focus adjustment of a photo lens based on the image sensor output.

3. The auto-focus detection device according to claim 2, further comprising:

a pair of image sensors; and said optical system includes a focus detection optical system that conducts two images of a subject in parallax onto the pair of image sensors.

4. The image sensor system according to claim 1, further comprising:

a pair of the image sensors; and said optical system includes a focus detection optical system that conducts two images of a subject in parallax onto the pair of image sensors.

5. An auto-focus detection system, comprising:

an optical system;

an image sensor that outputs an image signal according to a light intensity distribution of a subject image that has been composed by the optical system;

an amplifier that amplifies the image signal from the image sensor;

an amplification ratio switching component that changes an amplification ratio of the amplifier to a prescribed amplification ratio;

an accumulation time interval calculating component that calculates an accumulation time interval of the image sensor based on a target value of the image sensor output that has been selected according to the amplification ratio and the amplified image output; and an image sensor controller that controls the operation of the image sensor based on the accumulation time interval that is calculated by the accumulation time interval calculating component.

6. An auto-focus detection system according to claim 5, further comprising a focus adjustment information calculator that calculates information relating to a focus adjustment of a photo lens based on the image sensor output.

7. The auto-focus detection system according to claim 5, further comprising:

a pair of image sensors; and said optical system includes a focus detection optical system that conducts two images of a subject in parallax onto the pair of image sensors.

8. An auto-focus method for a camera, comprising the steps of:

initiating auto-focus;

setting a gain to a predetermined low value;

establishing an initial accumulation time interval for image sensors;

accumulating a charge in the image sensors using the accumulation time interval;

using a peak value of an image output of the image sensors as an initial sensor value;

calculating a defocus amount based on the image output;

driving an object lens based on the defocus amount; and checking whether the gain is set at the predetermined low value, wherein when the gain is the predetermined low value as determined by the checking step, further comprising the steps of:

determining whether the image output is saturated;

determining whether a difference between a peak value of the image output and an automatic gain control target value when the gain is the predetermined low value is within an allowable range when the image output is not saturated;

recalculating the accumulation time interval when the difference is greater than the allowable range;

checking whether the accumulation time interval is greater than a predetermined time interval;

resetting the gain to a predetermined high value when the accumulation time interval is greater than the predetermined time;

recalculating the accumulation time interval to be related to the reset gain; and returning to the accumulating a charge step.

9. The method according to claim 8, wherein when checking the gain shows it not to be set to the predetermined low value, further comprising the steps of:

determining whether the image output is saturated when the gain is set to a predetermined high value;

determining whether a difference between a peak value of the image output and an automatic gain control target value when the gain is the predetermined high value are within an allowable range when the image output is not saturated;

recalculating the accumulation time interval when the difference is greater than the allowable range;

checking whether the accumulation time interval is smaller than a predetermined time;

resetting the gain to the predetermined low value when the accumulation time interval is smaller than the predetermined time;

recalculating the accumulation time interval to be related to the reset gain; and returning to the accumulating a charge step.

10. The method according to claim 8, wherein when the image output is saturated, further comprising the steps of:

re-establishing the gain at the predetermined low value;

substituting a second predetermined time interval as the accumulation time interval; and returning to the accumulating a charge step.

11. The method according to claim 9, wherein when the image output is saturated, further comprising the steps of:

re-establishing the gain at the predetermined low value;

substituting a second predetermined time interval as the accumulation time interval; and returning to the accumulating a charge step.

12. The method according to claim 8, wherein when the difference is within the allowable range, returning to the accumulating a charge step.

13. The method according to claim 9, wherein when the difference is within the allowable range, returning to the accumulating a charge step.

14. The method according to claim 8, wherein when the accumulation time interval is less than the predetermined time, returning to the accumulating a charge step.

15. The method according to claim 9, wherein when the accumulation time interval is greater than the predetermined time, returning to the accumulating a charge step.

* * * * *